(12) United States Patent
Ungrady et al.

(10) Patent No.: US 7,976,767 B2
(45) Date of Patent: Jul. 12, 2011

(54) LIGHTWEIGHT PREFORM AND METHOD OF MANUFACTURE

(75) Inventors: Eric B. Ungrady, Mount Wolf, PA (US); Sunil S. Shah, York, PA (US); Michael P. Wurster, York, PA (US)

(73) Assignee: Graham Packaging Company, L.P., York, PA (US)

( * ) Notice: Subject to any disclaimer, the term of this patent is extended or adjusted under 35 U.S.C. 154(b) by 731 days.

(21) Appl. No.: 11/453,917

(22) Filed: Jun. 16, 2006

(65) Prior Publication Data
US 2007/0292642 A1    Dec. 20, 2007

(51) Int. Cl.
*B29C 49/06* (2006.01)
*B65D 1/02* (2006.01)

(52) U.S. Cl. ....... 264/535; 264/523; 264/537; 428/35.7; 428/36.92; 215/40; 215/42; 215/44

(58) Field of Classification Search .......... 264/523, 264/535, 537; 428/36.92, 542.8; 215/41, 215/42, 43, 44, 45, 46; 220/640, 643, 644
See application file for complete search history.

(56) References Cited

U.S. PATENT DOCUMENTS

| | | | |
|---|---|---|---|
| 4,288,478 A * | 9/1981 | Kinoshita et al. | 428/36.92 |
| 4,649,068 A | 3/1987 | Collette | |
| 5,366,774 A * | 11/1994 | Pinto et al. | 428/36.92 |
| 5,756,172 A * | 5/1998 | Semersky | 428/36.92 |
| 6,648,157 B2 * | 11/2003 | Shai et al. | 215/42 |
| 6,974,047 B2 | 12/2005 | Kelley et al. | |
| 2003/0168374 A1 * | 9/2003 | O'Neill | 206/515 |
| 2005/0158495 A1 | 7/2005 | Nahill | |

FOREIGN PATENT DOCUMENTS

JP    11208630 A  *  8/1999

OTHER PUBLICATIONS

Kapolas, W., "Voluntary Standard CSD Finish PCO-1810", Closure Manufacturers Association, 2003, https://secure.closuremanufacturers.org/files/specifications/58/PCO-1810.pdf (registration required)).*

* cited by examiner

*Primary Examiner* — Philip C Tucker
*Assistant Examiner* — William P Bell
(74) *Attorney, Agent, or Firm* — Knoble Yoshida & Dunleavy, LLC

(57) ABSTRACT

A preform for use in blow molding a plastic container is disclosed herein. The preform has an open end and closed end, and a body adapted to form a body of the container when the container is blow molded. The preform further includes a finish having a top surface, an inner wall having circumferentially-spaced thin segments alternating with thick segments, and an outer wall wherein the thin segments exist entirely in the finish and extend towards the open end of the body of the preform. The thick segments do not extend to the top surface.

20 Claims, 3 Drawing Sheets

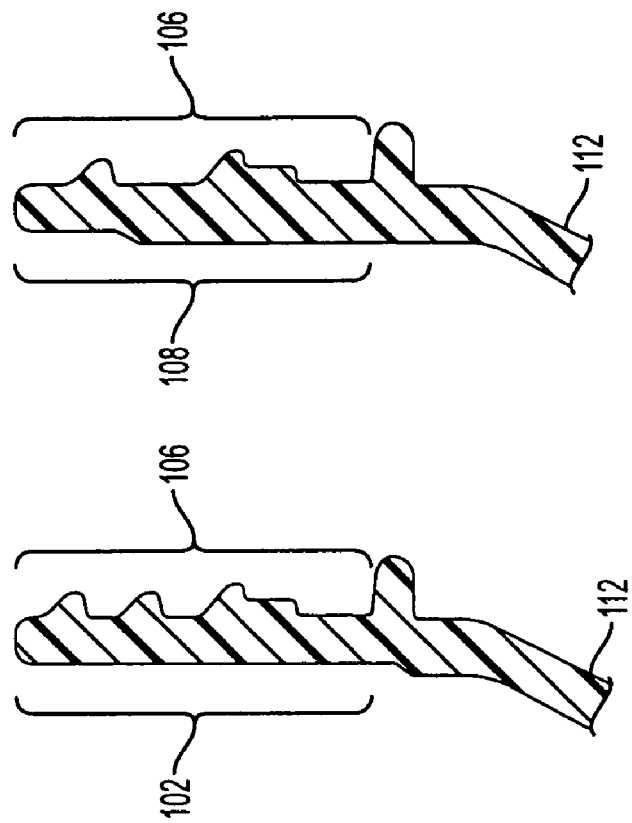
FIG. 5
FIG. 4
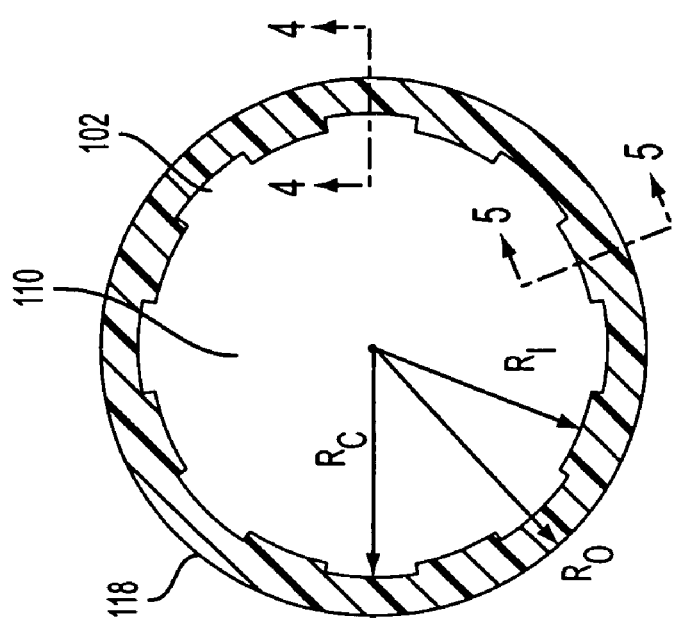
FIG. 3

LIGHTWEIGHT PREFORM AND METHOD OF MANUFACTURE

BACKGROUND OF THE INVENTION

1. Field of the Invention

The present invention relates generally to a preform for use in blow molding a plastic container, and more particularly to a lightweight preform having a plurality of corrugated structures in the finish.

2. Description of Related Art

Preform thickness is determined by the material properties of the plastic from which the preform is made and the intended use of the preform. Specifically, if a preform is to be molded into a container suitable to hot-fill or pasteurization processes, the preform must be thick enough so that the resulting container can withstand processing conditions. Additionally, the preform must have a diameter that is compatible with the machine that is used when the preform is molded to a container.

Preforms are used to produce a wide variety of products, such as containers. Accordingly, the preforms themselves must differ depending on their intended use. A one-size-fits-all preform is not practical; however, it is also inefficient and expensive to have different machines to handle different types of preforms. For this reason, many preforms are made having a thicker finish than desired, in order to accommodate existing preform handling machinery. The drawback of the increased thickness is that the preform weight is also increased, which increases production costs. Thus, there is a need in the art for a lightweight preform that is compatible with standard preform handling parts.

BRIEF SUMMARY OF THE INVENTION

The present invention is directed to a preform for use in blow molding a plastic container. The preform includes a body having an open end and closed end, the body being adapted to form a body of the container when the container is blow molded. The preform further includes a finish having a top surface, an inner wall having circumferentially-spaced thin segments alternating with thick segments, and an outer wall. The thin segments exist entirely in the finish and extend towards the open end of the body of the preform, and the thick segments do not extend to the top surface.

The thin segments can have a radial thickness of about 0.050 to about 0.100 inch or about 0.060 to about 0.090 inch. The thin segments can further have a height that is less than or equal to a height of the finish, or the height of the thin segments can be less than or equal to approximately 1 inch. The thin segments can be rectangular-shaped, and they can have the same height. The thick segments can include a surface for contacting a molding tool.

The present invention is further directed to a preform for use in blow molding a plastic container, the preform having a finish with a top surface, an inner wall with circumferentially-spaced, alternating raised portions and non-raised portions, and an outer wall, wherein the non-raised portions exist entirely in the finish and do not extend into the body of the preform, and the raised portions do not extend to the top surface. The raised portions can have a radial thickness of about 0.090 inch to about 0.125 inch. Additionally, the raised portion can include ribs or protrusions.

The present invention is also directed to the method of manufacturing a plastic container by blow molding the preform described herein, including the step of manufacturing the preform.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements.

FIG. 3 depicts a cross-sectional top view of the lightweight preform of FIG. 2, taken along line 3-3 of FIG. 2;

FIG. 4 shows a cross-section of the thin portion of the finish wall of the lightweight preform of FIG. 3, taken along line 4-4 of FIG. 3;

FIG. 5 shows a cross-section of the thick portion of the finish wall of the lightweight preform of FIG. 3, taken along line 5-5 of FIG. 3.

DETAILED DESCRIPTION OF THE INVENTION

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the invention.

Figure 1:
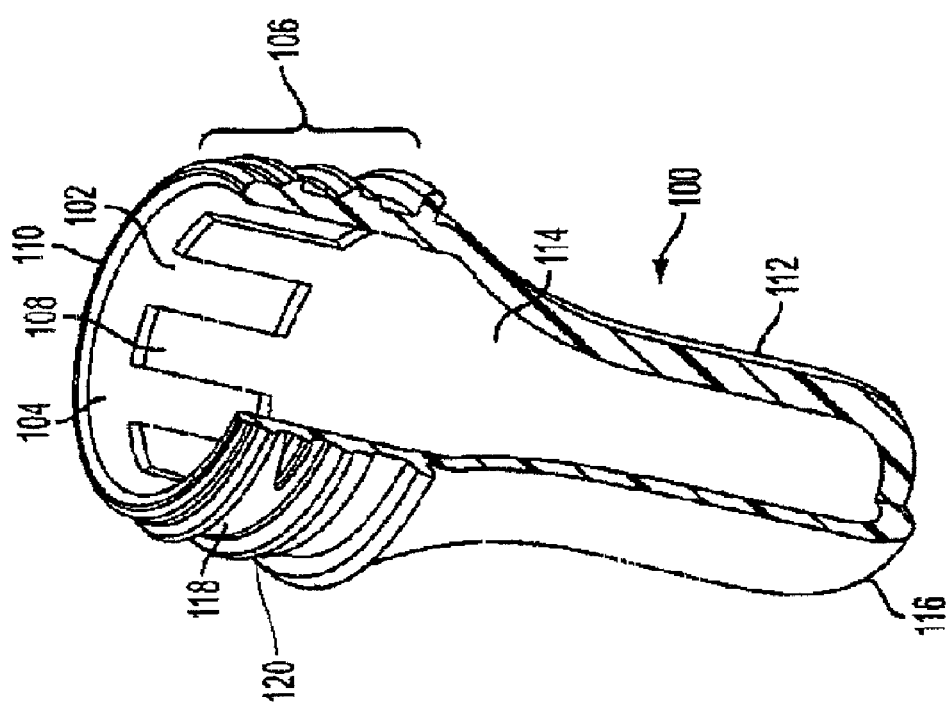
FIG. 1 depicts a perspective view of the lightweight preform according to one embodiment of the present invention.

FIG. 1 depicts a perspective, cutaway view of a lightweight preform 100 having thin segments 102 and thick segments 108 along an inner wall 104 of a finish 106. The thickness of the inner wall 104 where the thin segments 102 are present, also referred to as the radial thickness of the thin segments, can be from about 0.050 to about 0.100 inches. In particular embodiments, the radial thickness of the thin segments can be about 0.060 to about 0.090 inches. In a specific embodiment, the radial thickness of the thin segments can be 0.090 inches. In the embodiment pictured in FIG. 1, the thin segments 102 appear as alternating segments along the inner wall 104. The arrangement of the thin segments 102 is such that the inner wall 104 contains alternating, thick 108 and thin 102 segments. The thickness of the inner wall 104 at the thick segments 108, also referred to as the radial thickness of the thick segments, is determined by the tool being used in the manufacturing process and the outside diameter of finish 106. This is because the thick segments 108 can engage or contact a molding tool, such as a spindle, that is used during the blow molding process. This tool can be part of a larger blow molding apparatus that is used to blow mold a container from the lightweight preform 100.

Figure 6C:
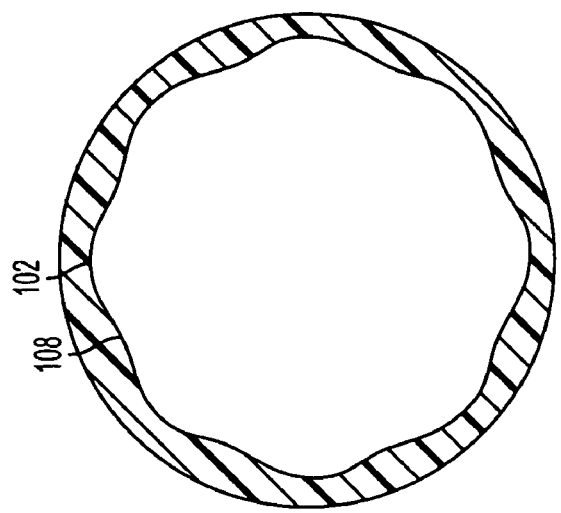
FIGS. 6A-6C show cross-sections of alternative embodiments of the lightweight preform of FIG. 2, taken along line 3-3.
Figure 6B:
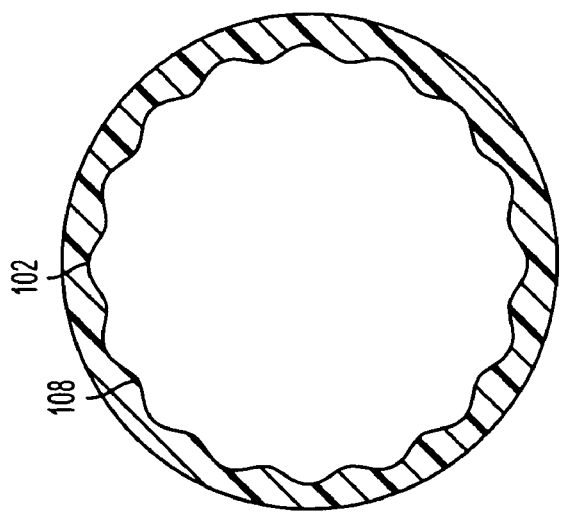
Figure 6A:
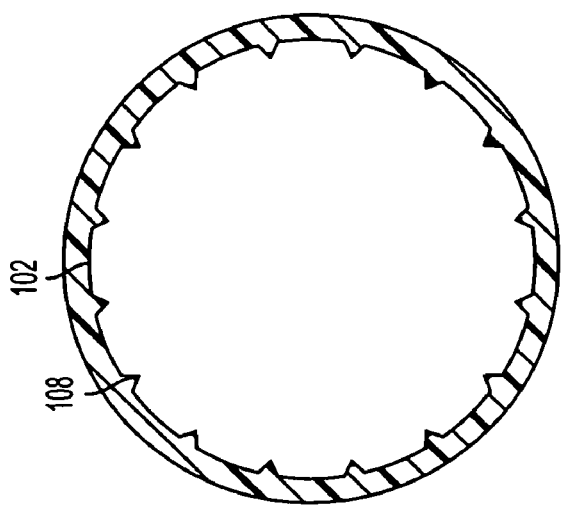

The radial thickness of the thick segments 108 preferably ranges from about 0.090 inch to about 0.125 inch. A preform suitable for use in accordance with the present invention can have, for example, a thick segment 108 with a radial thickness of about 0.120 inch. In the illustrated Figures, both thick segments 108 and thin segments 102 are depicted as rectangular. However, it is also possible to have the segments take on a variety of shapes, as illustrated in FIG. 6A-6C. For example, the thick segments or raised portions 108 can take the form of a polygon, such as triangular ribs. Additionally, raised portions 108, can include protrusions, which can be polygonal, circular, elliptical, and other similar shapes. In certain embodiments, raised portions 108 and/or thin segments/non-raised portions 102 need not take on a particular defined shape. For example, where raised portions 108 include ribs and/or protrusions, the remaining part of the inner wall 104 that is the non-raised portion 102 may not have a clearly describable shape. Further, there can be a gradual transition from the thick segments or raised portions 108 to the thin segments or non-raised portions 102, instead of a sharp change in radial thickness along the inner wall 104.

In the depicted FIGS. 1-5, the thin segments 102 all have the same radial thickness. However, thin segments 102 having varying thicknesses (from each other) are also contemplated by the invention. As the radial thickness of the thick segments 108 is partly determined by the tool used, the radial thickness of each of the thick segments 108 does not differ substantially. Further, the radial thickness of the thin segments 102 is less than the radial thickness of the thick segments 108.

The finish 106 has a top surface 110 (see FIGS. 1-3) from which the thin segments 102 are preferably evenly spaced. In the embodiment shown in FIG. 1, the thin segments 102 do not extend to the top surface. Below the finish 106 is preform body 112, having an open end 114 and a closed end 116. Thin segments 102 extend along the inner finish wall 104 towards the open end 114 of the body 112. In the illustrated embodiment, the thin segments 102 exist entirely in the finish 106 and do not extend into the body 112 of the preform 100. The thin segments 102 preferably have a height that is less than the height of the finish 106, which will vary depending on the type of preform used and can be determined by a person of skill in the art. For example, the thin segments 102 can have a height that is less than or equal to one inch. In the embodiment illustrated in the Figures, the height of the thin segments 102 can be less than or equal to about 0.763 inches. The height of the thin segments 102 can be the same or different from each other.

Figure 2:
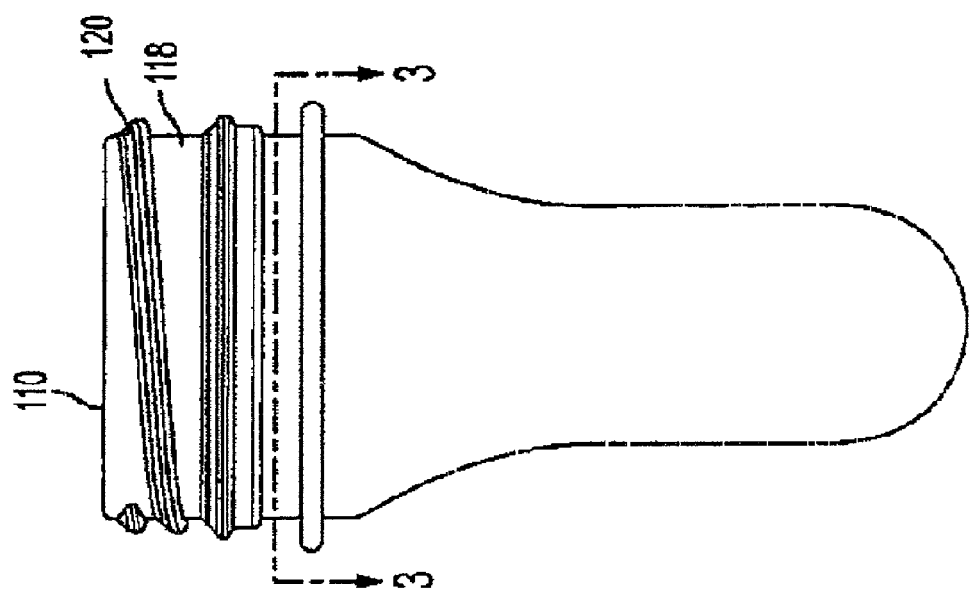
FIG. 2 depicts a front view of the lightweight preform of FIG. 1.

FIG. 2 shows a front view of the preform 100 of FIG. 1, which illustrates the outer wall 118 of the finish 106. Outer wall 118 can include a mechanism for attaching a closure, such as threads 120. Other means of attachment as known in the art can also be used.

Both FIGS. 1 and 2 show the thin segments 102 being evenly spaced from each other along the inner wall 104, but alternate arrangements, such as asymmetrical spacing, are within the scope of the invention.

FIG. 3 shows a cross-section a taken along line 3-3 of FIG. 2, which illustrates the difference in radial thickness between thin segments 102 and thick segments 108. FIG. 4 is a cross section taken along line 4-4 of FIG. 3, showing the area of the preform that corresponds to the thin segment or non-raised portion 102 and also continues downward through the finish 106 and into the preform body 112. FIG. 5 is a cross section taken along line 5-5 of FIG. 3, showing the area of the preform that corresponds to thick segment or raised portion 108 and also continues downwards through the finish 106 and into the preform body 112.

As best shown in FIG. 3, the preform 100 has an outer radius $R_O$ that extends from the center of the preform 100 to the outer wall 118, an inner radius $R_I$ that extends from the center of the preform 100 to the inner wall 104 at the thick portion 108, and an inner radius $R_C$ that extends from the center of the preform 100 to the inner wall 104 along where thin segments 102 are located. The outer radius $R_O$ and inner radius $R_I$ have dimensions that are compatible with standard machinery used in the art. This allows the preform 100 to be used with standard equipment. Again, the specifications of the preform 100 with respect to $R_O$ and $R_I$ will vary based on the equipment being used. The inner radius $R_C$ that extends from the center of the preform 100 to the thin segments 102 is slightly larger than the inner radius $R_I$, which extends from the center of the preform 100 to the finish wall 104 where the thick portions 108 are located. The benefit provided by these two different radii along the inner wall 104 is that the preform 100 has a lighter weight when compared to standard preforms, but still can accommodate standard equipment. This offers a significant advantage over standard preforms. The lighter weight of the preform reduces the costs of the container manufacturing process without requiring the expense of complete new machinery (i.e. machinery that would be needed to accommodate a smaller, lighter preform having unique specifications). With the present invention, the only new machinery required is a core for the injection tool. The lightweight preform is compatible with standard spindles.

The present invention also offers significant weight and cost savings, particularly when mass production is taken into consideration. Gram weight savings, per part, can be 5% or higher. For example, with a preform having a 43 mm finish (the maximum diameter of the finish, in approximate measure), the gram weight savings can about 2 grams per part or more. The preform 100 described herein is suited to a variety of finishes, such as but not limited to 33 mm, 43 mm, or 48 mm. The larger the preform, the more significant the weight and cost savings.

The present invention also includes the method of manufacturing a blow molded container by providing the lightweight preform 100 as described herein and blow molding the container.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

What is claimed is:

1. A preform for use in blow molding a plastic container, the preform comprising:
   a body having an open end and closed end, the body being adapted to form a body of the container when the container is blow molded;
   a finish having a top surface, an inner wall having circumferentially-spaced thin segments alternating with thick segments, an outer wall and a boundary portion formed between the thin segments and the thick segments;
   wherein the thin segments exist entirely in the finish and extend towards the open end of the body of the preform, wherein the thick segments do not extend to the top surface and further wherein the boundary portions exist entirely in the finish;
   and
   further wherein the thick segments are substantially the same width as the thin segments.

2. The preform of claim 1 wherein the thin segments have a radial thickness of about 0.050 to about 0.100 inch.

3. The preform of claim 1, wherein the thin segments have a radial thickness of about 0.060 to about 0.090 inch.

4. The preform of claim 1, wherein the thin segments have a height that is less than or equal to a height of the finish.

5. The preform of claim 4, wherein the height of the thin segments is less than or equal to approximately 1 inch.

6. The preform of claim 1, wherein the thin segments are rectangular-shaped.

7. The preform of claim 6, wherein the thin segments have the same height.

8. The preform of claim 1, wherein the thick segments further comprise a surface for contacting a molding tool.

9. A preform for use in blow molding a plastic container, the preform comprising
   a body adapted to form a body of the container when the container is blow molded; and
   a finish having a top surface, an inner wall with circumferentially-spaced, alternating raised portions and non-raised portions, an outer wall and a boundary portion formed between the raised portions and the non-raised portions;
   wherein the non-raised portions exist entirely in the finish and do not extend into the body of the preform, wherein the raised portions do not extend to the top surface and further wherein the boundary portions exist entirely in the finish; and
   further wherein the raised portions are substantially the same width as the non-raised portions.

10. The preform of claim 9, wherein the raised portions have a radial thickness of about 0.090 inch to about 0.125 inch.

11. The preform of the claim 9, wherein the raised portions further comprise a surface for contacting a molding tool.

12. The preform of claim 9, wherein the raised portions further comprise ribs.

13. The preform of claim 9, wherein the raised portions further comprise protrusions.

14. A preform for use in blow-molding, the preform comprising
   a top surface; and
   a finish having an inner and an outer wall, the inner wall having circumferentially-spaced alternating thick and thin segments; a boundary portion formed between the thick segments and the thin segments;
   wherein the thin segments extend along but not beyond the finish, wherein the thick segments do not meet the top surface and further wherein the boundary portions exist entirely in the finish; and
   further wherein the thick segments are substantially the same width as the thin segments.

15. The preform of claim 14, wherein the thin segments have a radial thickness of about 0.050 to about 0.1000 inch.

16. The preform of claim 14, wherein the thin segments have a radial thickness of about 0.060 to about 0.90 inch.

17. The preform of claim 14, wherein the thick segments have a surface for contacting a molding tool.

18. The preform of claim 14, wherein the thin segments have a height that is less than or equal to a height of the finish.

19. A method of manufacturing a blow-molding container comprising
   providing the preform of claim 1, and
   blow molding the preform to form a container.

20. The method of claim 19, wherein the step of providing includes manufacturing the preform.

\* \* \* \* \*